(12) United States Patent
Parker (10) Patent No.: US 8,820,422 B2
(45) Date of Patent: Sep. 2, 2014

(54) PRESSURE ASSISTED AERIAL RETARDANT DELIVERY SYSTEM

(71) Applicant: Leonard K. Parker, Gardnerville, NV (US)

(72) Inventor: Leonard K. Parker, Gardnerville, NV (US)

( * ) Notice: Subject to any disclaimer, the term of this patent is extended or adjusted under 35 U.S.C. 154(b) by 0 days.

(21) Appl. No.: 14/133,411

(22) Filed: Dec. 18, 2013

(65) Prior Publication Data

US 2014/0102732 A1   Apr. 17, 2014

Related U.S. Application Data

(63) Continuation of application No. 13/504,902, filed as application No. PCT/US2011/058621 on Oct. 31, 2011, now Pat. No. 8,640,782.

(60) Provisional application No. 61/408,459, filed on Oct. 29, 2010.

(51) Int. Cl.
*A62C 25/00* (2006.01)
*A62C 27/00* (2006.01)
*A62C 29/00* (2006.01)

(52) U.S. Cl.
USPC ............... 169/53; 169/62; 169/56; 244/136; 239/171

(58) Field of Classification Search
CPC ........ A62C 25/00; A62C 27/00; A62C 29/00; A62C 3/07; A62C 3/08; A62C 35/00; A62C 3/00; A62C 3/06; A62C 37/00; A62C 8/00; B64D 1/00; B64G 1/36

USPC ............ 169/34, 53, 54, 56, 62; 244/136, 171
See application file for complete search history.

(56) References Cited

U.S. PATENT DOCUMENTS

| | | | | |
|---|---|---|---|---|
| 1,749,504 A * | 3/1930 | Pelton | ............................ | 252/399 |
| 3,698,480 A * | 10/1972 | Newton | .......................... | 169/43 |
| 3,901,467 A * | 8/1975 | Hawkshaw | .................... | 244/136 |
| 5,183,116 A * | 2/1993 | Fleming | ........................... | 169/43 |
| 8,066,223 B2 * | 11/2011 | Hale et al. | ...................... | 244/136 |

* cited by examiner

*Primary Examiner* — Justin Jonaitis
(74) *Attorney, Agent, or Firm* — Holland & Hart LLP (57) ABSTRACT

An aerial retardant delivery system comprising a retardant tank mountable in the fuselage of an aircraft. The tank includes a pressure opening in fluid communication with the fuselage such that pressure in the fuselage may act on retardant contained in the tank. The tank includes an outlet extending through a sidewall of the aircraft's fuselage, through which retardant may be delivered to a target. The system also includes a discharge gate operative to open and close the outlet. An actuation mechanism is disposed on the exterior of the tank and operatively coupled to the at least one discharge gate. A variable flow controller controls the discharge gate open position in order to provide retardant over a desired area of terrain. A one-way flapper is disposed in the pressure opening and is operative to allow pressure in the fuselage to enter the tank while inhibiting retardant from spilling from the tank.

27 Claims, 11 Drawing Sheets

PRESSURE ASSISTED AERIAL RETARDANT DELIVERY SYSTEM

CROSS REFERENCE TO RELATED APPLICATION

This is application is a continuation of U.S. 371 National Phase Patent Application entitled "Pressure Assisted Variable Flow Clean Throat Aerial Retardant Delivery System," Ser. No. 13/504,902, filed Aug. 20, 2012, which claims priority through Applicants' prior U.S. PCT Patent Application entitled "Pressure Assisted Variable Flow Clean Throat Aerial Retardant Delivery System," Serial Number PCT/US11/58621, filed Oct. 31, 2011, which claims priority through the Applicants' prior U.S. Provisional Patent Application entitled "Pressure Assisted Variable Flow Clean Throat Aerial Retardant Delivery System," Ser. No. 61/408,459, filed Oct. 29, 2010, all of which prior Applications are hereby incorporated by reference in their entirety. It is to be understood, however, that in the event of any inconsistency between this specification and any information incorporated by reference in this specification, this specification shall govern.

BACKGROUND

Wildfires often erupt in remote areas having difficult terrain. Conditions such as high winds and dry weather may also cause a fire to become very large, very quickly resulting in an out of control fire that threatens woodland resources and developed areas alike. In order to combat wildfires under such conditions firefighting aircraft, also known as airtankers and water bombers, are often employed. The speed and capacity of firefighting aircraft make them an important tool in fighting larger, out of control fires. Particularly, where it is time consuming or unsafe to deploy firefighters and equipment on the ground. Firefighting aircraft can quickly deliver large quantities of fire retardant or water to an area to help control fires.

The density of retardant delivered to a given area of terrain is often referred to as the coverage level rating. Coverage level ratings range from 1 to 8, which are expressed in gallons of retardant per hundred square feet. For example, a coverage level rating of 4 corresponds to 4 gallons of retardant per hundred square feet. Depending on the desired coverage level the required fire retardant flow rate discharged from a firefighting aircraft can reach 2000 gallons per second.

Conventional firefighting aircraft include a tank for carrying water or retardant and doors or gates that open to allow the payload to discharge onto or in advance of the flames. Traditional retardant delivery systems rely on gravity to propel the retardant through the gates. Accordingly, large gates are required to allow the retardant to flow from the aircraft at a sufficient rate to meet the higher coverage level ratings. With conventional firefighting aircraft the gates simply open and discharge the retardant all at once. The pilot must therefore compensate for the speed and altitude of the aircraft as well as the discharge characteristics of the delivery system in order to provide the desired coverage level in the desired area.

The payload of a typical firefighting aircraft is in the neighborhood of 20,000 pounds of retardant or water. In order to support the weight of the retardant against the gates substantial opening/closing mechanisms are required. Also, traditional opening/closing mechanisms are located inside the tank in order to allow for support struts along the length of the gates. This configuration has the disadvantage of interfering with the flow of retardant through the gates. Furthermore, typical retardant formulations include components that may be corrosive to the supports and mechanisms that operate the gates, such that over time the supports and or mechanisms may fail or at least require excessive maintenance.

Accordingly, there is a need for an aerial retardant delivery system that can assist the pilot in safely delivering a desired coverage level to an area of terrain threatened by wildfire. There is a still further need for a retardant delivery system gate opening/closing mechanism that is configured for improved discharge characteristics as well as gate mechanism reliability and ease of maintenance.

SUMMARY

Provided herein is an aerial retardant delivery system that includes an aircraft having a pressurized cabin system. The aerial retardant delivery system also includes a retardant tank located in the fuselage of the aircraft. The tank includes at least one opening that allows the cabin pressure to act on the retardant. In some embodiments the opening includes a door or flapper panel that allows cabin pressure to enter the tank yet inhibits retardant from spilling from the tank. Accordingly, retardant may be discharged from the aircraft at a pressure differential relative to the exterior of the aircraft. In other words, the discharge of retardant is pressure assisted. As a result, in some embodiments smaller discharge gates may be used while maintaining discharge rates required to meet coverage level ratings. The smaller discharge gates can, in some instances, reduce the gate area exposed to the pressure of the retardant payload. Thus, the opening/closing mechanism is, in certain systems, less bulky than traditional mechanisms. Furthermore, the opening/closing mechanism is, in some applications, disposed on the exterior of the tank, thereby allowing unimpeded flow of retardant through the discharge gates which provides a clean throat discharge design. Locating the opening/closing mechanism outside of the tank also helps, in some embodiments, to isolate the mechanism from the fire retardant.

Some instances of the aerial retardant delivery system also include a variable flow control system that controls the discharge gate open positions in order to provide the desired coverage level rating over a desired area of terrain. Some embodiments of the control system account for many variables in deploying the retardant. For example, the system may compensate for aircraft speed, altitude, pitch, and location (GPS). Furthermore, the system may compensate for retardant viscosity, volume of retardant, pressure differential between retardant (cabin pressure) and exterior of the aircraft, and discharge gate position feedback. The control system also includes, in certain systems, safety features for protecting the aircraft and pilot. The control system may include a pressure differential interlock that prevents the discharge gates from opening if the pressure differential between cabin pressure and exterior pressure is too great. The control system also may also protect the fuselage by controlling the discharge of retardant in order to reduce the oil canning effect that can occur if the cabin pressure changes rapidly. If the cabin pressure changes too rapidly it can cause the walls of the fuselage to "oil can" or move back and forth. Repeated oil canning can fatigue the airframe and thus reduce the life of the aircraft.

In an embodiment, the aerial retardant delivery system comprises a retardant tank mountable in the fuselage of an aircraft. The retardant tank includes at least one pressure opening in fluid communication with the fuselage such that pressure in the fuselage may act on retardant contained in the retardant tank. The tank includes at least one outlet extending through a sidewall of the aircraft's fuselage, through which retardant may be delivered to a target. The system may also include at least one discharge gate operative to selectively open and close the outlet. An actuation mechanism may be disposed on the exterior of the tank and operatively coupled to the at least one discharge gate. A variable flow controller may control the discharge gate open position in order to provide retardant over a desired area of terrain. The system may further comprise a one-way flapper disposed in the pressure opening that is operative to allow pressure in the fuselage to enter the tank while inhibiting retardant from spilling from the tank.

In an embodiment, the tank is configured as a polygonal funnel. In some instances, the tank includes a main portion having a top wall and a plurality of surrounding sidewalls extending from the top wall and a neck portion extending from the main portion of the tank and extending through the sidewall of the fuselage.

In an embodiment, the variable flow controller may include a pressure differential interlock whereby the discharge gate is not opened if the difference in pressure between the pressure in the fuselage and ambient pressure exceeds a selected threshold level.

Also contemplated is an aircraft for delivering fire retardant to a target area. In an embodiment the aircraft comprises a fuselage having a surrounding sidewall and at least one engine. The aircraft includes a fuselage pressurization system that is operative to selectively pressurize at least a portion of the fuselage. A retardant tank is disposed in the fuselage that includes at least one pressure opening in fluid communication with the fuselage such that pressure in the fuselage may act on retardant contained in the retardant tank. At least one outlet extends through the sidewall of the fuselage, through which retardant may be delivered to the target. At least one discharge gate may be included that is operative to selectively open and close the outlet.

A method of delivering retardant to a target with an aircraft is also provided herein. In an embodiment, the method comprises containing a quantity of retardant within a storage region of the aircraft, pressurizing an interior region of the aircraft, causing the interior region and the storage region to be in fluid communication, and selectively discharging the quantity of retardant from the storage region under the influence of pressure from the interior region. In an embodiment, the retardant is allowed to discharge from the storage region only when the difference in pressure between the pressure in the interior region and ambient pressure is within a selected threshold level.

BRIEF DESCRIPTION OF THE DRAWINGS

The accompanying drawings, which are incorporated in and constitute a part of this specification, illustrate embodiments of an aerial fire retardant delivery system and together with the description, serve to explain the principles and operation thereof. Like items in the drawings are generally referred to using the same numerical reference.

DETAILED DESCRIPTION

Provided herein is an aerial fire retardant delivery system for safely delivering a desired coverage level of retardant to an area of terrain threatened by wildfire. The disclosed aerial fire retardant delivery system includes gate modules that are configured for improved discharge characteristics as well as gate mechanism reliability and ease of maintenance. The aerial retardant delivery system also includes a variable flow control system that controls the discharge gate open positions in order to provide the desired coverage level rating over a desired area of terrain. The control system includes a pressure differential interlock and anti-oil canning technology further described herein. While the various embodiments are described with respect to fire retardant, this should not be construed as limiting and other fluidic or particulate substances, for example, may be deployed from an aircraft using the apparatuses and methods disclosed herein.

Figure 1:
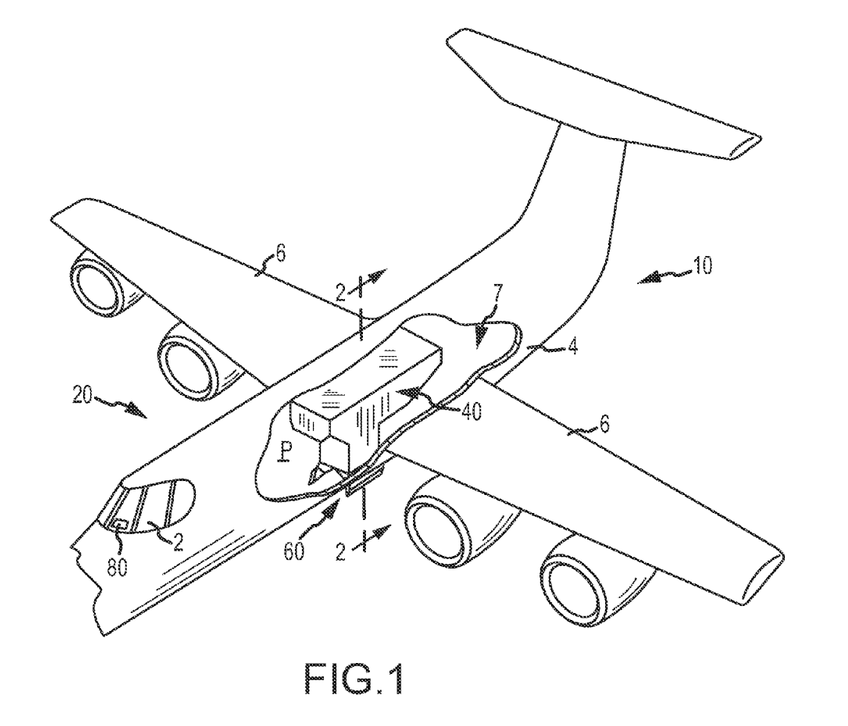
FIG. 1 is a partial perspective cutaway view of an aircraft equipped with the fire retardant delivery system according to an exemplary embodiment.
Figure 2:
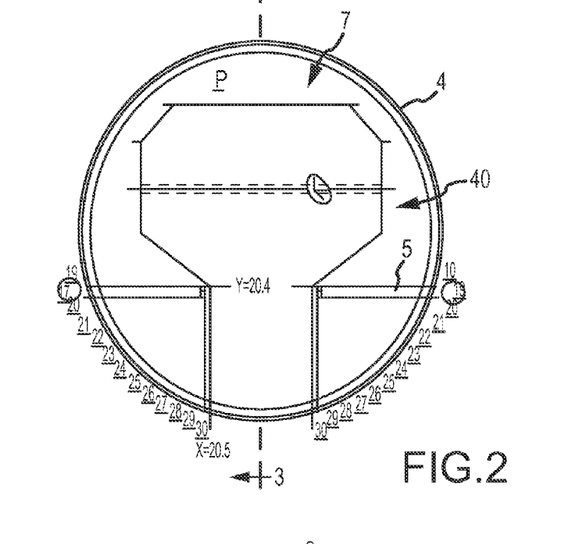
FIG. 2 is a cross section view of the aircraft fuselage taken about line 2-2 in FIG. 1 showing the placement of the retardant tank.
Figure 3:
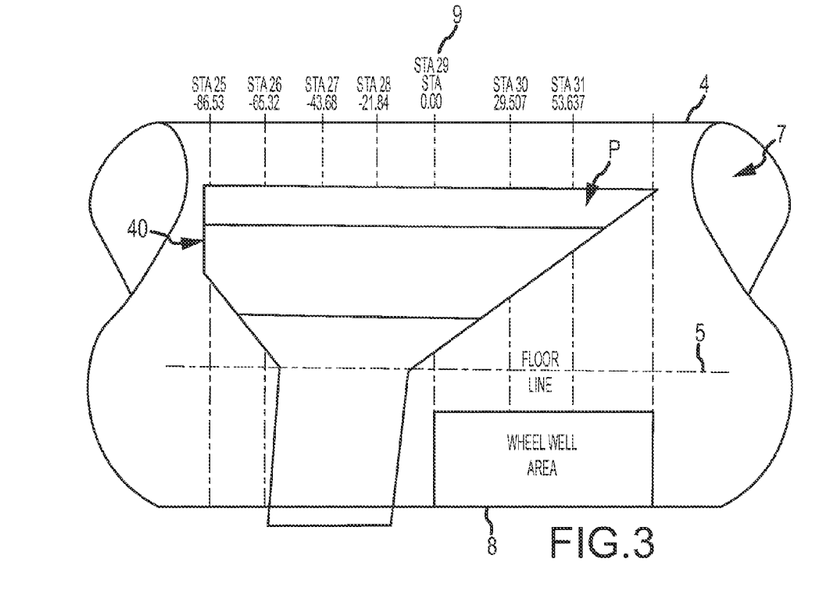
FIG. 3 is a partial cross section view of the aircraft fuselage taken about line 3-3 in FIG. 2.
Figure 4:
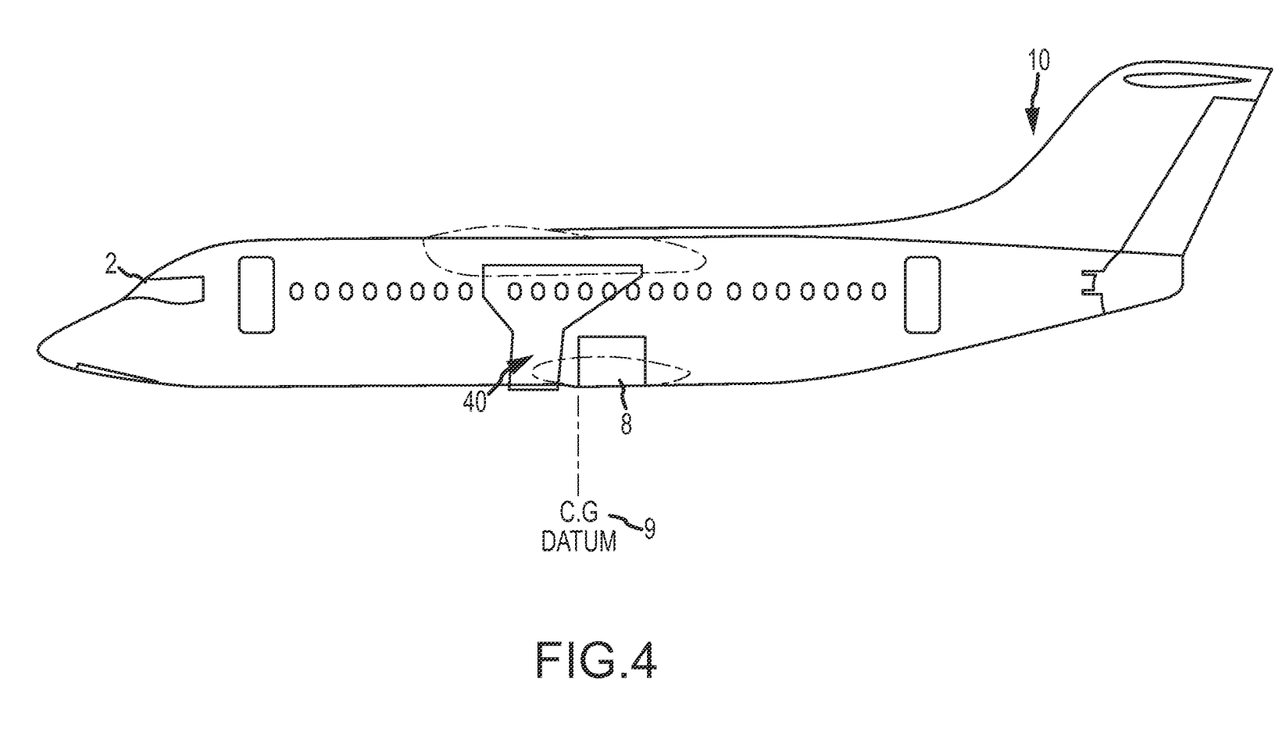
FIG. 4 is a side view in elevation of the aircraft showing the placement of the retardant tank relative to the aircraft's frame stations and center of gravity datum.

FIG. 1 illustrates an aircraft 10 equipped with aerial retardant delivery system 20 according to an exemplary embodiment. System 20 comprises a storage region, in the form of retardant tank 40, with gate modules 60. The system is controlled by variable flow control system 80 located in the aircraft cockpit 2. Control system 80 may include a controller in the form of an integrated computer module and control screen or separate computer, control screens, and interfaces and control panels. The retardant tank 40 is located in the interior 7 of the fuselage 4 at an appropriate location in accounting for the weight and balance limits of the particular aircraft. In this case, the tank is located near the wings 6 in order to locate the tank 40 near the aircraft's center of gravity. With further reference to FIGS. 2 and 3 it can be appreciated that in this embodiment a majority of tank 40 is located in the fuselage above floor decking 5. A portion of tank 40 extends through decking 5 and extends beneath the underside of the aircraft. As best shown in FIG. 3, tank 40 is, in this embodiment, located forward of the wheel well area 8. FIG. 4 is a side view of the aircraft illustrating the location of tank 40 relative to the air frame stations and the center of gravity 9. While the embodiments herein are described with respect to a particular aircraft, in this case a BAe 146, other aircraft may be used as an aerial tanker. It should be appreciated with respect to FIGS. 1-4 that tank 40 is exposed via pressure openings in the tank to cabin pressure P that, in some aircraft, is provided by the aircraft's engines to the interior 7 of fuselage 4.

Figure 5:
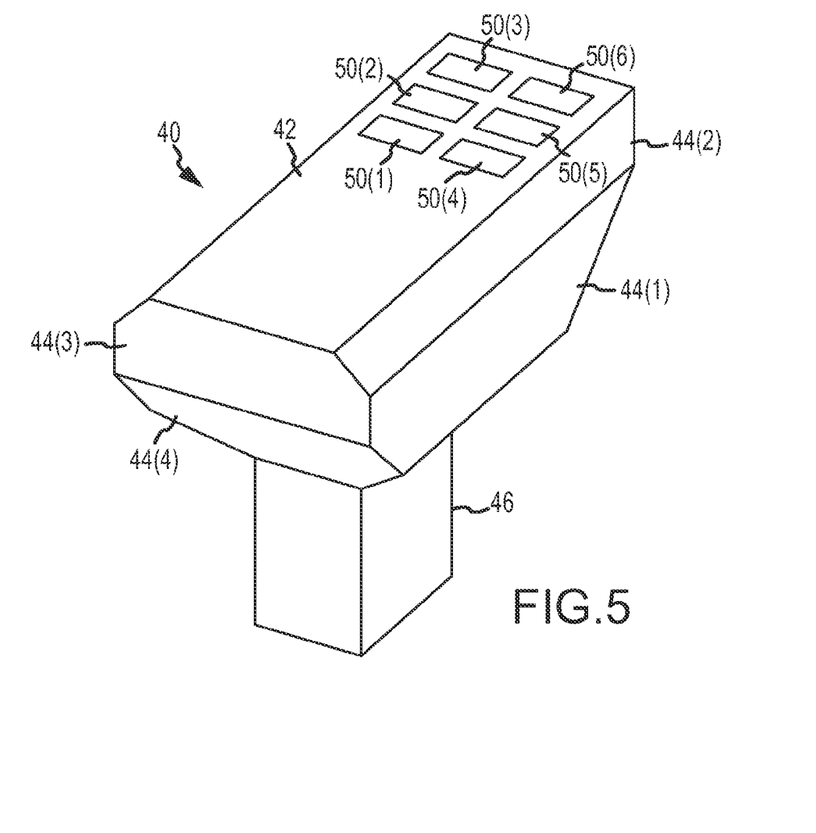
FIG. 5 is a perspective view of the retardant tank according to an exemplary embodiment.
Figure 6:
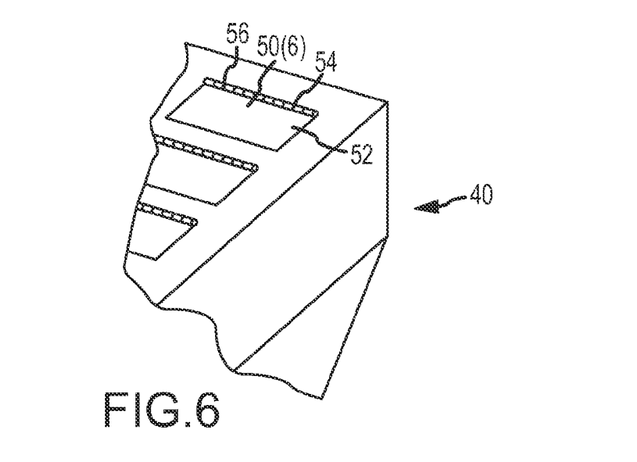
FIG. 6 is an enlarged partial perspective view of the one-way pressure valves according to an exemplary embodiment.

Cabin pressure P is used to assist the discharge of retardant contained in tank 40 from the aircraft. The cabin pressure P is generally greater than the pressure outside the aircraft's fuselage thereby creating a pressure differential. FIG. 5 illustrates a plurality of one-way flapper valves 50(1)-50(6) disposed in the pressure openings. With continued reference to FIG. 6 it can be seen that flapper valves 50 each include a door 52 that is rotatably attached to the tank 40 with a hinge, such as a piano hinge. The flapper is installed on the inside of the tank such that it can only open inward against spring 56, which acts to bias door 52 in the closed position. Therefore, as the tank is opened to atmospheric pressure, cabin air at cabin pressure P is allowed to enter the tank through the pressure openings, thereby assisting in discharging retardant from the tank. Returning briefly to FIG. 5 it can be appreciated that tank 40 is configured as a polygonal funnel. Tank 40 includes a main portion having a top wall 42, through which flapper valves 50 open into the interior of the tank. Extending from top wall 42 are a plurality of surrounding sidewalls 44(1)-44(4). Neck portion 46 (also referred to as throat portion 46) extends from the main portion of the tank and extends through the floor of the aircraft and extends through a sidewall of the fuselage. It can be appreciate from the figures that tank 40 has a funnel shape configured to further assist the efficient flow of retardant from tank 40.

Figure 7:
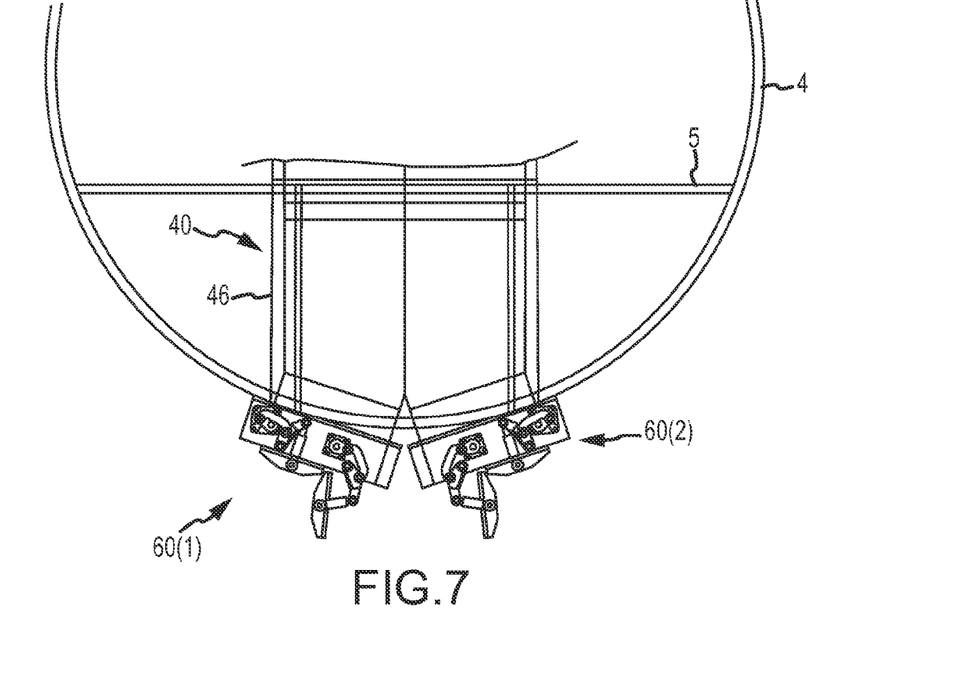
FIG. 7 is a partial cross section view of the fuselage similar to that of FIG. 2 illustrating the gate modules according to an exemplary embodiment.
Figure 8:
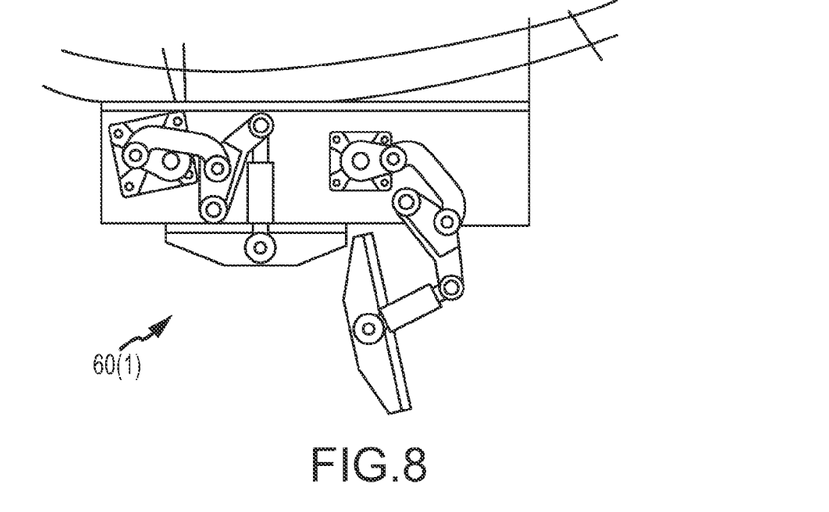
FIG. 8 is an enlarged end view of a gate module shown in FIG. 7.

As shown in FIG. 7, this embodiment includes a pair of discharge gate modules 60(1) and 60(2) disposed on neck portion 46 adjacent an outlet of the tank. Gate modules 60 control the flow of retardant leaving tank 40. As will be described more fully below, the gates are controlled by control system 80, located generally in the cockpit of the aircraft. The control system measures a plurality of variables in order to efficiently, safely, and accurately disperse the retardant over the target area. FIG. 8 is an enlarged side view of discharge gate module 60(1), which shows the module with one of two gates open. Accordingly, the system can control the retardant discharge rate by the number of gates that are opened as well as by how far each gate is opened. Furthermore, as can be seen in FIGS. 7-10, the gate opening mechanisms are located outside of the discharge throat 46 resulting in a clean throat design.

Figure 9:
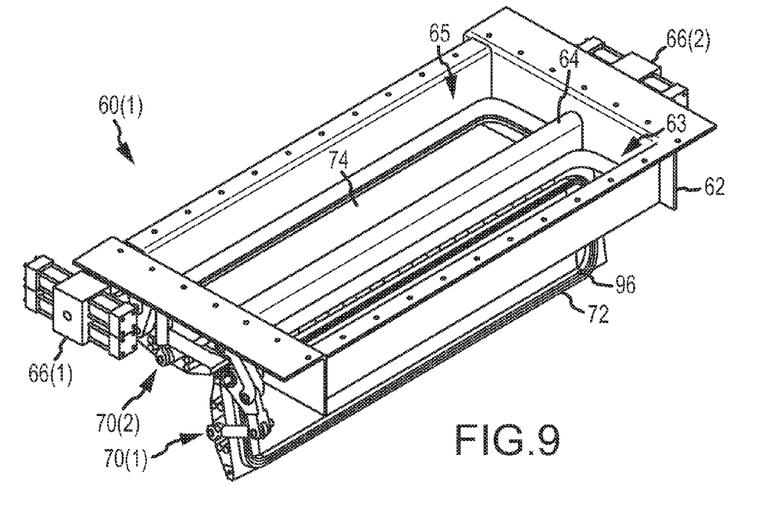
FIG. 9 is a perspective view of a gate module shown in FIGS. 7 and 8.
Figure 10:
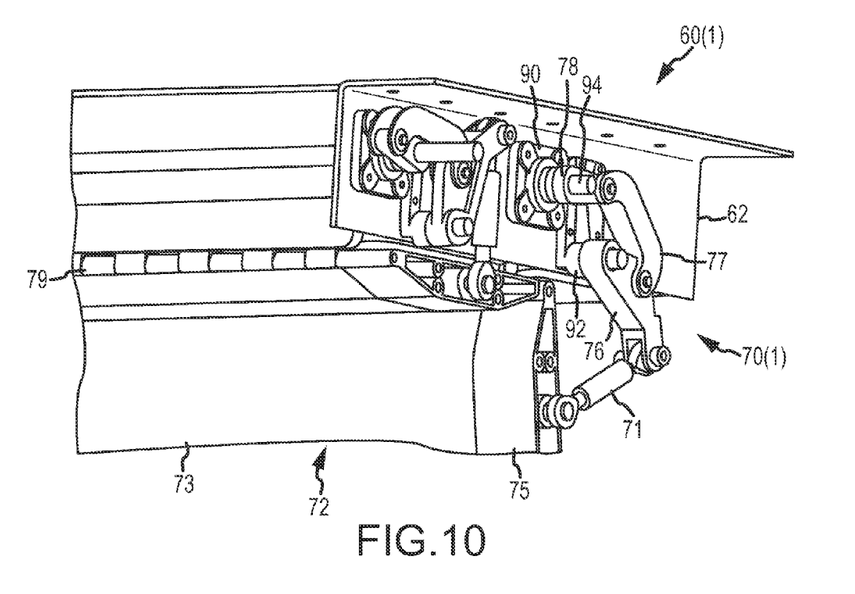
FIG. 10 is an enlarged partial perspective view of the gate actuation mechanism according to an exemplary embodiment.

Referring to FIG. 9, gate module 60(1) includes an elongate frame 62 with a channel 64 bisecting the frame to form two discharge openings 63 and 65. Each discharge opening has a respective gate 72 and 74 (sometimes referred to herein as doors) hingedly disposed therealong. See for example, hinge 79 in FIG. 10, which attaches gate 72 to frame 62. Each gate includes a gasket 96 disposed along a peripheral margin of the gate in order to help seal the tank 40 against leakage. Each gate is comprised of a center section 73 with end caps 75 disposed thereon. Tunnel 64 accommodates one of two drive shafts used to actuate the gates. Actuators 66(1) and 66(2) rotate the drive shafts to actuate gate actuation mechanisms 70(1) and 70(2) as best shown in FIG. 10.

Drive shaft 94 is supported on both ends of the frame 62 by flange bearings 90. Drive shaft 94 extends through the flange bearing 90 and connects to a primary actuator arm 78 which in turn connects to toggle arms 77. Toggle arms 77 are connected to secondary actuator arm 76, which is mounted on spindle bracket 92. Finally, the secondary actuator arm 76 connects to the gate 72 via adjustable tie rod 71. Tie rod 71 can be adjusted to provide the desired closing force necessary to compress gasket 96 when the gate is in the closed position. FIG. 10 shows gate 72 in the open position while gate 74 is in the closed position. When the gate is in the closed position toggle arms 77 rotate over the center of drive shaft 94, thereby providing an over center toggle which transfers the opening forces generated against the gate by the retardant to the mechanism 70 rather than to actuator 66. As viewed from the end shown in FIG. 10, the gates are closed by rotating the drive shafts in a counter clockwise direction and opened by rotating the shafts approximately 180 degrees in the clockwise direction.

The variable flow control system 80 may be implemented with an off the shelf industrial PLC (Programmable Logic Controller), such as an Omron CJ1 series PLC, which includes discrete inputs and outputs; analog inputs and outputs; and serial communication ports. In an exemplary embodiment, the programming language may be "Ladder Logic" type symbolic code. The control system as described herein may be implemented with, for example, a PC or microcontroller based system using various programming languages as appropriate. Furthermore, the system hardware may comprise an integrated system or a modular system of controllers and modules as desired.

The control system provides the ability to not only equally adjust the door angles of the four doors but also allows asymmetrical combinations of door opening positions to achieve any desired flow rate.

The software is preferably modular in nature to ease certification and allow expansion of functionality. The software modules are generally organized by function. One functional module is a self diagnostic section. The self diagnostic section monitors the door system for differences between normal operational parameters vs. real-time results. The diagnostic system may monitor several operating parameters, such as door slew (travel) speeds and angles; remaining tank volumes regardless of drop mode (normal or fractional); door position feedback vs. full travel limit switches; and tank level indication vs. tank pressure, to name a few.

The system may include the following functional modules and sub-modules, each of which is described more fully below:

Pilot Interface
System Control
    Mode Select—Safe/Take-off/Armed
        Coverage Level Select
        Fractional Quantity Select
    Pilot indication
        Tank Quantity in pounds, gallons, bar graph
        Mode Selected
        Drop Switch position—Detent 1 or Detent 2
Aircraft Input
Get and parse aircraft flight data
Produce "G" load offset computation
Produce Pitch angle offset computation
Produce Cabin pressure differential offset computation
Produce speed offset computation
Door Controller
Convert coverage level values to door angular settings. (Target positions)
Convert door prox measurements to angular values Compare door current position to door target position and compute output correction signal Cross check door limit travels against door position prox values Tank Quantity Head press computation Liquid level computation Head/Level correlation for quantity indication Predictive computation for drop—door orifice vs. time Create timeouts for selectable quantity.

Diagnostic Monitor

Door Speed

Door Position vs. LS crosschecks

Tank Volume Crosscheck

Sensor disagreement

Drop dynamics Door position and time open vs. remaining tank quantity

Figure 11:
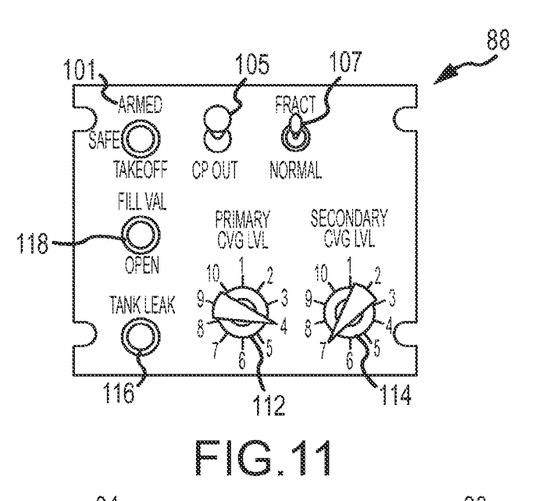
FIG. 11 is a front view of a console control panel.

Control system 80 includes a console control panel 88, shown in FIG. 11, which allows the pilot to configure the display system and adjust the drop coverage levels. The control panel 88 includes an ARMED/SAFE/TAKEOFF switch 101 that allows the pilot or co-pilot to select which operational mode the system is in. "Safe Mode" will lock the door locks and reactivate the Ground Proximity and Gear Warning systems. "Take-Off" will unlock the doors and activate the Ground Proximity and Gear Warning circuits. "Armed" will unlock the doors and override the Ground Proximity and Gear Warning circuits. A CP IN/CP OUT switch 105 allows deactivation of the co-pilot's drop switch. A FRACT/NORMAL switch 107 selects the drop mode to be used. A FILL VAL OPEN light 118 indicates that the fill valve for tank loading is opened. A TANK LEAK light 116 will illuminate if there is fluid leaking into the fuselage from the tank.

Figure 12:
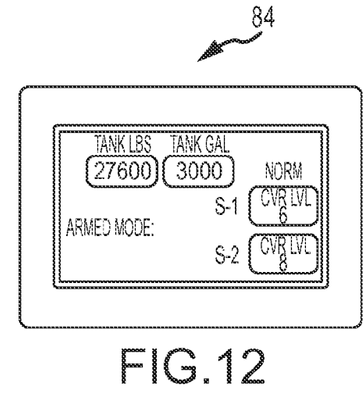
FIG. 12 is an illustration of a console touch screen representing the normal mode screen.
Figure 13:
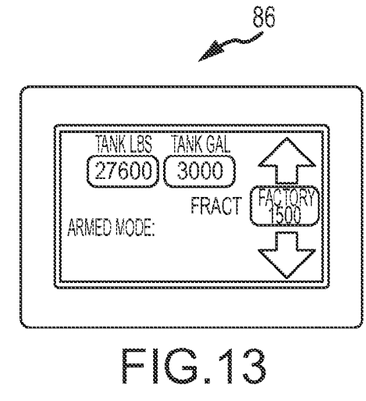
FIG. 13 is an illustration of a console touch screen representing the fractional mode screen.

The control panel 88 also includes PRIMARY CVG LVL switch 112 that selects the coverage level used when the drop switch is pressed to the first detent. SECONDARY CVG LVL switch 114 selects the coverage level used when the drop switch is pressed to the second detent. Coverage level selector switches 112 and 114 are preferably rotary selector switches. The selector switch positions are converted into the initial settings for the four doors and are placed into variables for each switch. These initial settings are obtained from a look-up table stored in memory. These will be the base values that all modifiers are applied against to compute target door positions. Drop quantity is selected via a center console mounted touch screen shown in FIGS. 12 and 13. FIG. 12 shows the touch screen in NORMAL mode 84 and FIG. 13 shows the touch screen in FRACTIONAL mode 86. The screen will allow selection in increments of 100 gallons. The Tank Quantity is preferably displayed on the center console touch screen in both gallons and pounds.

Figure 14:
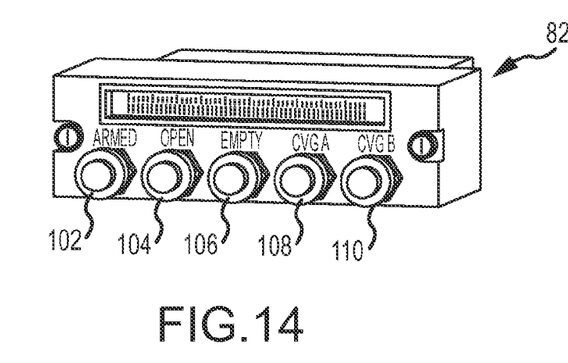
FIG. 14 is a perspective view of a cockpit indicator module.

A cockpit indicator 82, shown in FIG. 14, is provided to communicate various parameters to the pilot. The indicator module includes a Quantity Bar Graph 103, an ARMED light 102, an OPEN light 104, an EMPTY light 106, a CVG A light 108, and a CVG B light 110. The Quantity Bar Graph 103 is a line of LED's below graduation marks with the numbers 0, 5, 10, 15, 20, 25, 30 at the major graduation marks. These numbers represent 100's of gallons. The ARMED light 102 is illuminated when the switch 101 on the center console is in the "Armed" position. The OPEN light 104 is illuminated when any door is off of its closed limit switch. The EMPTY light 106 is illuminated when the tank is empty. The CVG A light 108 is illuminated when the drop switch is only on the first detent. The CVG B light 110 is illuminated when the drop switch is pushed on to the second detent.

The aircraft input module receives input from various sensors, input devices, and flight data. The flaps handle not in "UP" position is used with the ARMED mode selection to inhibit GPWS and Gear Warning System. Flight data is decoded by an interface unit that transmits the data to the PLC via message strings. For example, the following information may be sent to the PLC: "G" Load, Pitch Angle, Cabin Pressure Differential, Air or Ground Speed. The control system software computes the following data from the other variable inputs:

Produce "G" load offset computation and place in memory

Produce Pitch angle offset computation and place in memory

Produce Cabin pressure differential offset computation and place in memory

Produce Airspeed/Groundspeed offset computation and place in memory

The door controller module continuously calculates the target door position values based on selected parameters. For example the following seven parameters may be used to derive the target door position values:

1. The "A" and "B" coverage level selector switches in the cockpit
2. Master tank quantity variable
3. flight data infeed: Pitch angle
4. flight data infeed. "G" Loading
5. flight data infeed: Pressurization Differential
6. flight data infeed: Aircraft Speed.
7. Drop switch detent 1 or 2

The door target position is controlled by a variable in memory that represents the desired value (angle) of the door opening. This number is derived from the coverage level "A" or "B" variable depending on weather the drop switch is on detent 1 or 2 (Primary/Secondary). When the drop switch is not pressed, a "zero" value is written into the door target position variable. This causes the doors to close if they are open. Output commands to the proportional hydraulic control valves, which control the door actuators, are generated whenever the target door position and the actual door position do not match. The actual door position is converted and placed into a variable in memory based on the door position sensors.

The control system also continuously calculates and displays the quantity of retardant in the tank. The retardant level in the tank may be measured by a sensor in the tank, such as a float sensor. The tank float position reading is stored in memory. The control software references the vertical position of the float against a table of quantities located in memory. The table correlates the tank volumetric geometry to float position. The resulting volumetric value is placed in the "Master Tank Qty" variable in memory.

A tank head pressure reading is mathematically computed and placed in a variable in memory. Software references the pressure reading of the sensor against a table of quantities located in memory. The table characterizes the tank volumetric geometry to the pressure sensed. The result is placed in the "Reference Quantity" variable in memory. Parameters for fractional quantity drops are created based on same parameters as for continuous coverage operation.

Figure 15:
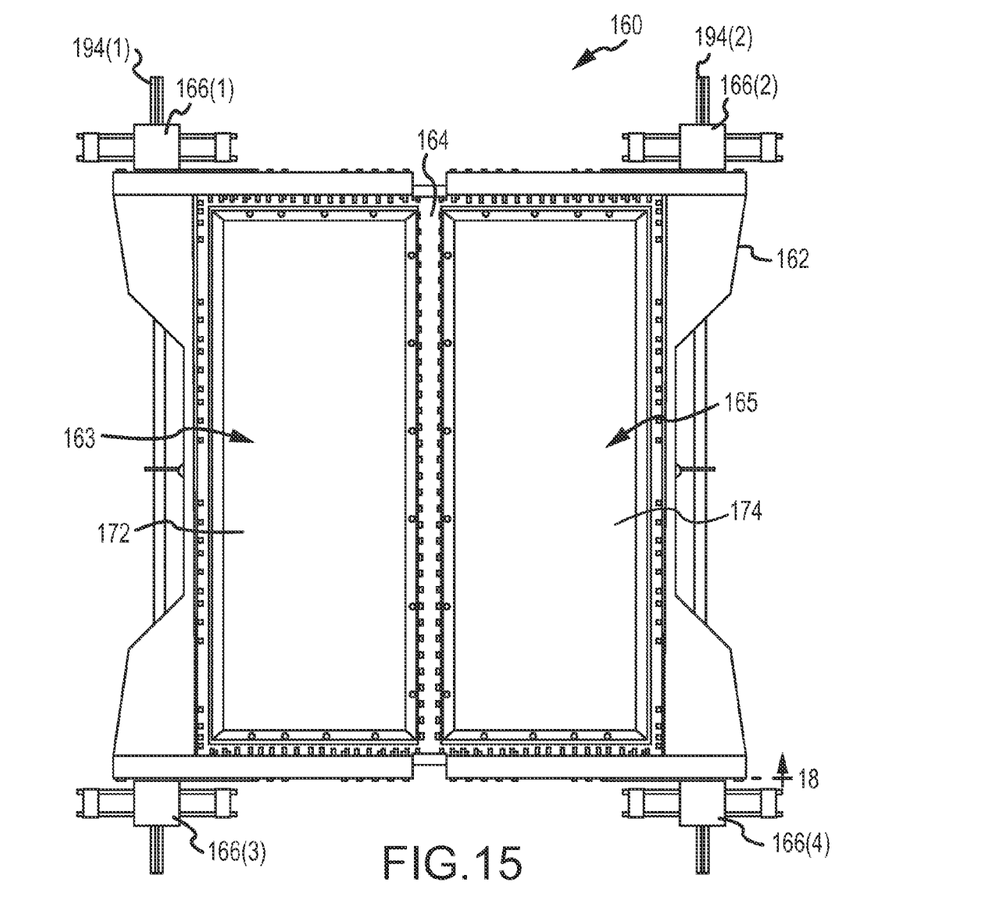
FIG. 15 is a top plan view of a discharge gate module according to a second exemplary embodiment.
Figure 16:
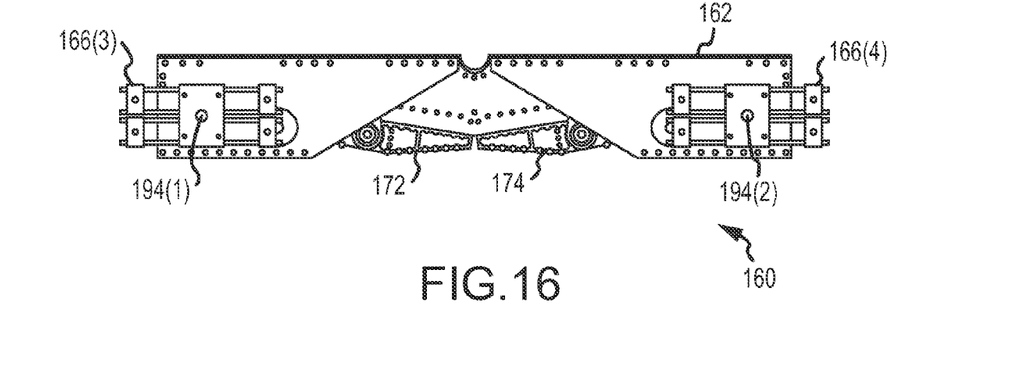
FIG. 16 is an end view of the discharge gate module shown in FIG. 15.
Figure 17:
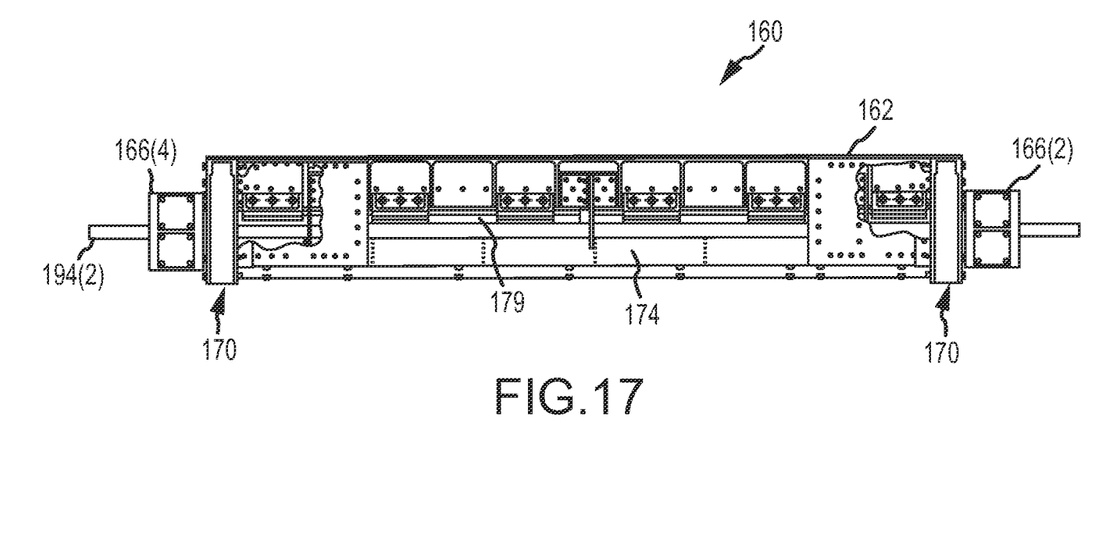
FIG. 17 is a side view in elevation of the discharge gate module shown in FIGS. 15 and 16.

FIGS. 15-21 illustrate a discharge gate module 160 according to an alternative embodiment. As shown in FIG. 15, module 160 includes two discharge gates 172 and 174. In this case, one discharge gate module 160 is used, rather than two discharge gate modules as described with respect to FIGS. 7-10. In this embodiment, the discharge gate module 160 includes a frame 162 having a divider member 164. Divider member 164 extends longitudinally down the length of frame 162, bisecting the frame to form two discharge openings 163 and 165. Each discharge opening has a respective gate 172 and 174 that is hingedly disposed therealong. See, for example, hinge 179 shown in FIG. 17, which attaches gate 174 to frame 162. Each gate may include a gasket disposed along a peripheral margin of the gate in order to help provide a seal between the gate and the tank. A plurality of actuators 166(1)-166(4) rotate the drive shafts 194(1) and 194(2) to operate gate actuation mechanisms 170 (see FIG. 18). In this embodiment, a pair of actuators acts on each drive shaft 194(1) and 194(2). For example, actuators 166(2) and 166(4) act on drive shaft 194(2).

Figure 18:
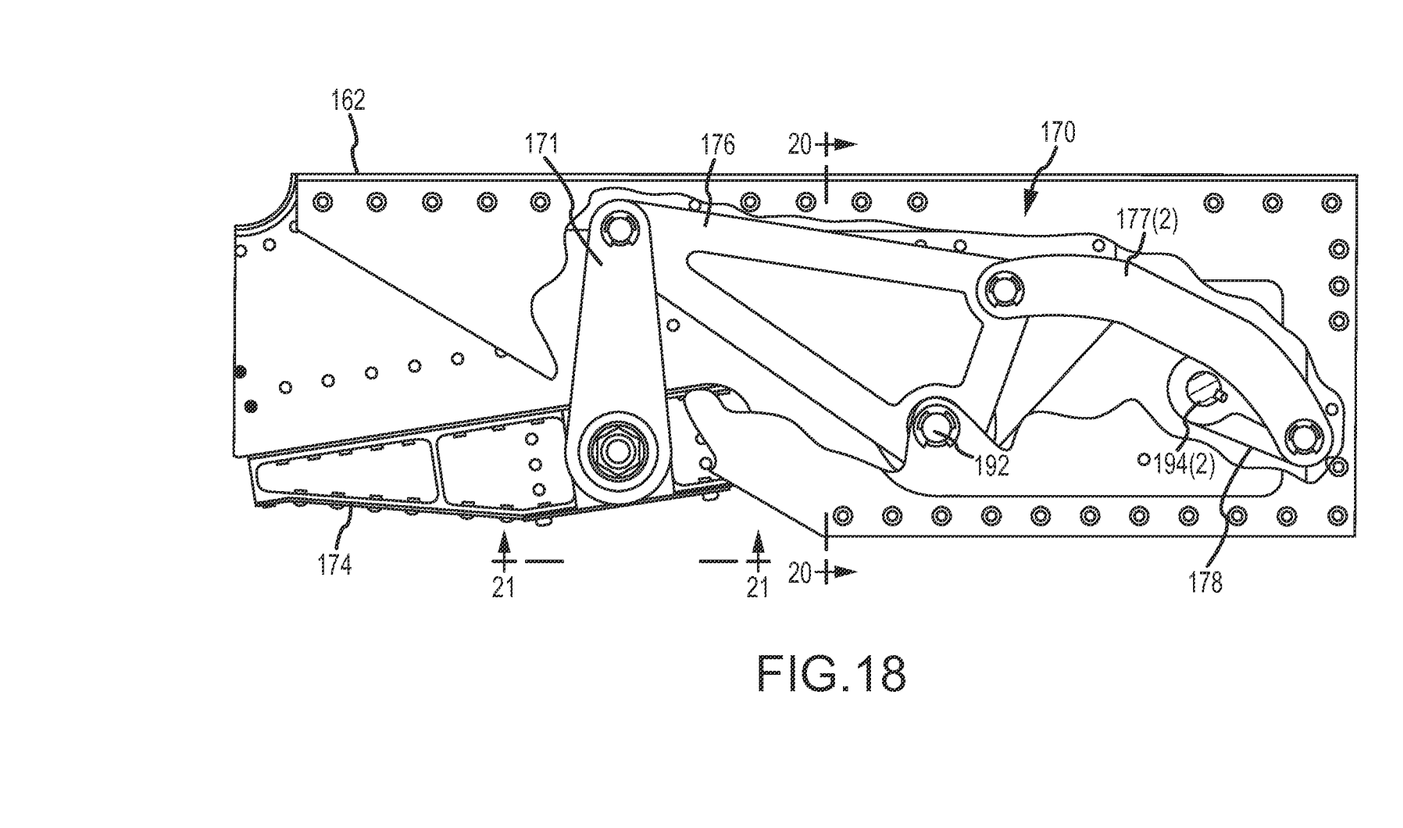
FIG. 18 is a partial cut-away cross-section of the discharge gate module taken about line 18-18 in FIG. 15.
Figure 19:
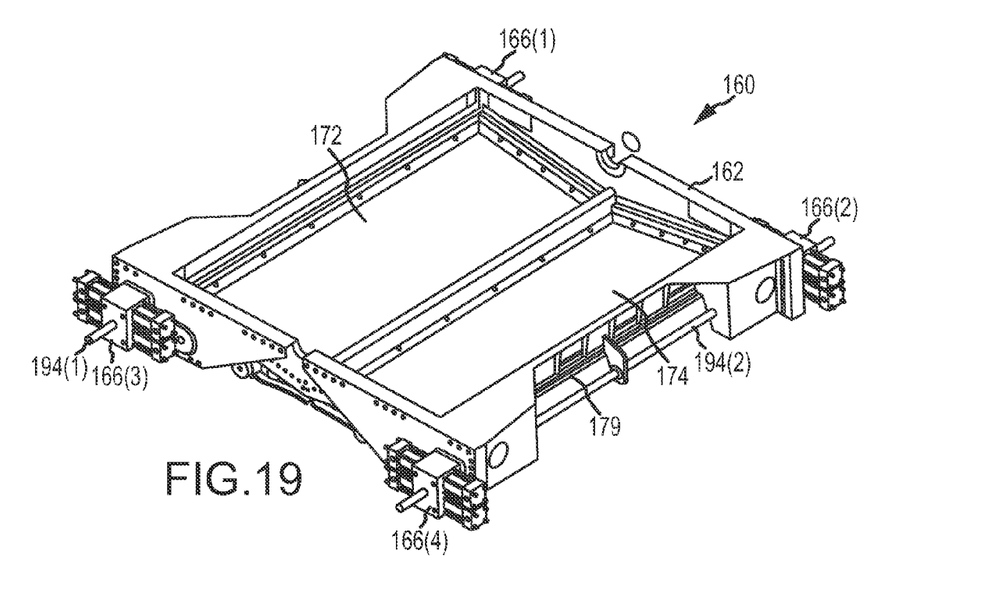
FIG. 19 is a perspective view of the discharge gate module shown in FIGS. 15-18.
Figure 20:
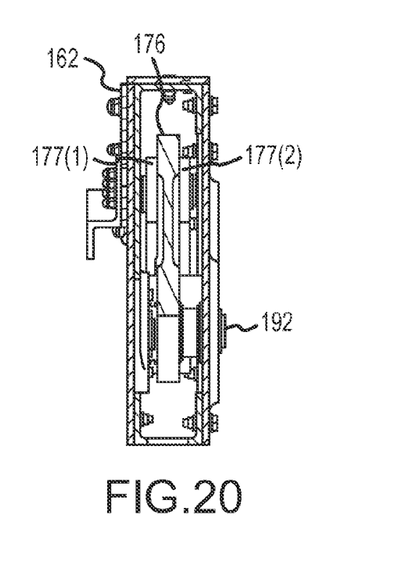
FIG. 20 is a cross-section of the actuator mechanism taken about line 20-20 in FIG. 18.
Figure 21:
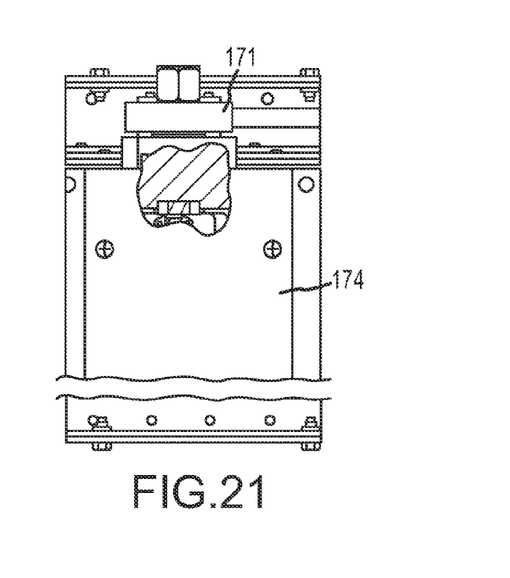
FIG. 21 is a bottom view of discharge gate as viewed from line 21-21 of FIG. 18.

With further reference to FIGS. 18 and 20, the actuation mechanism 170 includes a primary actuator arm 178 that is secured to drive shaft 194(2). Primary actuator arm 178 connects to toggle arms 177(1) and 177(2). Toggle arms 177 are connected to secondary actuator arm 176, which is mounted on spindle 192. Finally, the secondary actuator arm 176 connects to the gate 174 via crank arm 171 (also see FIG. 21). When gate 174 is in the closed position, toggle arms 177 rotate over the center of drive shaft 194(2), thereby providing an over-center toggle which transfers the opening forces generated against the gate by the retardant to the mechanism 170 rather than to actuators 166(4) and 166(2). As viewed from the end shown in FIG. 18, the gate 174 is closed by rotating the drive shaft 194(2) in a clockwise direction, and opened by rotating the shaft 194(2) approximately 180 degrees in the counter-clockwise direction. As with the embodiment shown in FIGS. 7-10, the gate opening module in this case is located outside of the discharge throat 46 resulting in a clean throat design. Also, discharge gate module 160 may be controlled as described above in order to provide retardant or other payload over a desired area of terrain.

Also contemplated herein are methods of delivering retardant to a target with an aircraft. The methods thus encompass the steps inherent in the above described structures and operation thereof. Broadly, one method may include containing a quantity of retardant within a storage region of the aircraft, pressurizing an interior region of the aircraft, causing the interior region and the storage region to be in fluid communication, and selectively discharging the quantity of retardant from the storage region under the influence of pressure from the interior region. In an embodiment, the retardant is allowed to discharge from the storage region only when the difference in pressure between the pressure in the interior region and ambient pressure (pressurization differential) is within a selected threshold level. In one embodiment, the selected threshold level may be approximately 0.5 to 1.0 psi, for example.

Accordingly, the fire retardant delivery system has been described with some degree of particularity directed to the exemplary embodiments thereof. It should be appreciated that the present invention is defined by the following claims construed in light of the prior art so that modifications or changes may be made to the exemplary embodiments of the present invention without departing from the concepts contained herein.

What is claimed is:

1. An aerial fire retardant delivery system, the system comprising in combination:
   A. an aircraft having a fuselage with (i) a fuselage exterior about an fuselage interior and (ii) a fuselage interior pressurization system;
   B. a fire retardant tank having a retardant tank exterior surrounding a retardant tank interior, the fire retardant tank being located within the fuselage of the aircraft and including:
      a fuselage air pressure delivery passage penetrating the retardant tank exterior and the retardant tank interior in fuselage air pressure communication with (i) the fuselage interior and (ii) the retardant tank interior; and
      at least one fire retardant delivery outlet extending through a sidewall of the fuselage; and
   C. at least one fire retardant discharge gate system in communication with the aerial retardant delivery outlet,
   whereby fuselage air pressure within the fuselage interior provided by the fuselage interior pressurization system can pressurize the retardant tank interior.

2. The aerial fire retardant delivery system of claim 1 further comprising a one-way valve having an air entry end and an air dispensing end, the one-way valve being disposed in the fuselage air pressure delivery passage with the air entry dispensing end in air dispensable communication with the retardant tank interior.

3. The aerial fire retardant delivery system of claim 2 wherein the aircraft is a converted passenger aircraft.

4. The aerial fire retardant delivery system of claim 1 wherein the fire retardant discharge gate system has:
   (i) a moveable retardant discharge gate;
   (ii) a discharge gate actuator having (a) a discharge gate moving section opposite an actuator driven section and (b) a linking section intermediate the discharge gate moving section and the actuator driven section; and
   (iii) a linking section support, the gate drive mechanism being moveable between a retardant discharge gate open position and a retardant discharge gate closed position with the linking section in supported contact with the linking section support,
   whereby the moveable retardant discharge gate can be supported in the retardant discharge gate closed position by the linking section support.

5. The aerial fire retardant delivery system of claim 4 wherein the aircraft is a converted passenger aircraft.

6. The aerial fire retardant delivery system of claim 1 including a variable retardant flow controller in controlling communication with a discharge gate actuator drive.

7. The aerial fire retardant delivery system of claim 6 wherein the variable flow controller includes a pressure differential interlock.

8. The aerial fire retardant delivery system of claim 7 further comprising a one-way valve having an air entry end and an air dispensing end, the one-way valve being disposed in the fuselage air pressure delivery passage with the air entry dispensing end in air dispensing communication with the retardant tank interior.

9. The aerial fire retardant delivery system of claim 8 wherein the aircraft is a converted passenger aircraft.

10. The aerial fire retardant delivery system of claim 7 wherein the aircraft is a converted passenger aircraft.

11. The aerial fire retardant delivery system of claim 1 wherein aircraft is a converted passenger aircraft.

12. An aircraft fuselage air pressure assisted fire retardant delivery system comprising in combination:
    an aircraft having a fuselage with a fuselage sidewall surrounding a fuselage interior;
    a fuselage interior air pressurization system;
    a retardant tank (i) within the fuselage interior, (ii) having a retardant tank interior, and (iii) including an air passage providing a pressurized air passageway from the fuselage interior into the retardant tank interior; and
    a retardant discharge outlet (i) in communication with the retardant tank interior and (ii) penetrating fuselage sidewall, whereby the fuselage interior air pressurization system can pressurize the fuselage interior and thereby the retardant tank interior.

13. The air pressure assisted fire retardant delivery system of claim 12 further comprising a one-way valve having an air entry end and an air dispensing end, the one-way valve being disposed in the air passage with the air entry dispensing end in air dispensable communication with the retardant tank interior.

14. The aerial fire retardant delivery system of claim 13 wherein the aircraft is a converted passenger aircraft.

15. The air pressure assisted fire retardant delivery system of claim 12 wherein the retardant discharge outlet includes a fire retardant discharge gate system:
   (i) a moveable retardant discharge gate;
   (ii) a discharge gate actuator having (a) a discharge gate moving section opposite an actuator driven section and (b) a linking section intermediate the discharge gate moving section and the actuator driven section; and
   (iii) a linking section support, the gate drive mechanism being moveable between a retardant discharge gate open position and a retardant discharge gate closed position with the linking section in supported contact with the linking section support,
whereby the moveable retardant discharge gate can be supported in the retardant discharge gate closed position by the linking section support.

16. The aerial fire retardant delivery system of claim 15 wherein the aircraft is a converted passenger aircraft.

17. The air pressure assisted fire retardant delivery system of claim 12 including a variable retardant flow controller in controlling communication with a discharge gate actuator drive.

18. The air pressure assisted fire retardant delivery system of claim 17 wherein the variable flow controller includes a pressure differential interlock.

19. The air pressure assisted fire retardant delivery system of claim 18 further comprising a one-way valve having an air entry end and an air dispensing end, the one-way valve being disposed in the air passage with the air entry dispensing end in air dispensable communication with the retardant tank interior.

20. The aerial fire retardant delivery system of claim 19 wherein aircraft is a converted passenger aircraft.

21. The aerial fire retardant delivery system of claim 18 wherein the aircraft is a converted passenger aircraft.

22. The aerial fire retardant delivery system of claim 12 wherein aircraft is a converted passenger aircraft.

23. A method of delivering fire retardant to a target from an aircraft having a fuselage with a fire retardant storage section within the fuselage in pressurized air communication with the fuselage, the method comprising:
   containing a quantity of fire retardant within a sealable fire retardant storage section;
   generating pressurized air within the fuselage of the aircraft;
   causing the pressurized air in the fuselage to transfer into the sealable fire retardant storage section;
   selectively discharging from the quantity of retardant within the sealable retardant storage section under the influence of the pressurized air within the sealable fire retardant storage section.

24. The fire retardant delivering method of claim 23 further comprising limiting discharging of the quantity of retardant from the sealable retardant storage section when a pressure differential between ambient pressure and interior pressure within the fuselage is outside of one or more predetermined air pressure thresholds.

25. The fire retardant delivering method of claim 24 wherein the sealable retardant storage region comprises a tank disposed in the interior region of the aircraft.

26. The fire retardant delivering method of claim 24 wherein the aircraft is a converted passenger aircraft.

27. The fire retardant delivering method of claim 23 wherein the aircraft is a converted passenger aircraft.

* * * * *